United States Patent [19]

Kornman et al.

[11] Patent Number: 5,064,471

[45] Date of Patent: Nov. 12, 1991

[54] SEALING WOOD FINISH

[76] Inventors: Karen J. Kornman, 9016 Chickamauga St., Tucson, Ariz. 85710; Michael J. Jorgensen, 44 Llewellyn Ave., Bloomfield, N.J. 07003

[21] Appl. No.: 439,249

[22] Filed: Nov. 20, 1989

[51] Int. Cl.$^5$ ........................ C08L 91/00; C09D 15/00
[52] U.S. Cl. ..................................... 106/250; 106/243; 106/244; 106/252; 106/263; 106/265; 106/266; 106/267
[58] Field of Search ............... 106/243, 244, 250, 252, 106/253, 266, 251, 221, 222, 263, 265, 237

[56] References Cited

U.S. PATENT DOCUMENTS

| | | | |
|---|---|---|---|
| 3,953,217 | 4/1976 | Goracke | 106/251 |
| 4,360,387 | 11/1982 | Brown et al. | 106/243 |
| 4,437,895 | 3/1984 | Koulbanis et al. | 106/250 |
| 4,814,016 | 3/1989 | Adkins et al. | 106/250 |

FOREIGN PATENT DOCUMENTS 3201134  7/1983  Fed. Rep. of Germany ...... 106/252

OTHER PUBLICATIONS

Eaves et al, "Varnish and Varnish Type Vehicles Containing Tung Oil", Paint and Varnish Production, 1960.

*Primary Examiner*—William R. Dixon, Jr.
*Assistant Examiner*—Anthony J. Green
*Attorney, Agent, or Firm*—Robert L. Tucker

[57] ABSTRACT

A sealing wood finish is composed of approximately 25% jojoba oil, 25% tung oil, 45% isopropanol, and 5% methylene chloride.

3 Claims, No Drawings

SEALING WOOD FINISH

BACKGROUND OF THE INVENTION

The present invention relates to wood finishes, and more particularly, to wood finishes that impart stain resistant properties to wood products.

When a product is made from wood, it needs to be provided with a sealing finish to render it resistant to other liquids such as alcohol and water. Typically, the sealing finish is applied to the wood product after it has been stained. However, a problem with these sealing finishes is that they tend to be very toxic.

Accordingly, it is an object of the present invention to provide a sealing wood finish that will render a wood product waterproof and resistant to other liquids such as alcohols.

Another object is to provide a sealing wood finish that can be applied to a wood product to make it resistant to other liquids such as stains.

A further object is to provide a sealing wood finish that is easy to apply.

Still another object is to provide a sealing wood finish that is less toxic than other sealing wood finishes.

SUMMARY OF THE INVENTION

It has now been found that the above and other objects of the present invention are attained in a sealing wood finish comprising approximately equal amounts of jojoba oil and tung oil, a solvent and an anti-separating agent. Preferably, the solvent is isopropanol and the anti-separation agent is methylene chloride.

In a preferred embodiment, the sealing wood finish comprises, by volume, approximately 25% jojoba oil, 25% tung oil, 5% methylene chloride and 45% isopropanol.

DETAILED DESCRIPTION OF THE INVENTION

The sealing wood finish of the present invention includes, by volume, approximately 25% jojoba oil, 25% tung oil, 45% isopropanol, and 5% methylene chloride. The one-to-one oil to oil ratio provides the type of surface desired, namely, a protective seal.

The isopropanol is employed as a solvent because use of the jojoba oil and the tung-oil alone would result in a viscous mixture that would not properly absorb into the wood. Hexane, toluene, methanol, chloroform, and methylene chloride can also be used, although isopropanol is the least toxic of the solvents. The methylene chloride is added to prevent separation of the oils from the alcohol base.

In use, the sealing wood finish is applied by brush to hardwood furnishings or anything made of wood, such as a finished wood product. It can be applied to the wood product after it has been stained or it can be applied alone on natural wood or in combination with a stain. The unique properties of the wood finish also allow it to be used as a dilution agent for a stain or any other oil-based product.

When applying the sealing wood finish, it should be done either outdoors or in a heavily ventilated area. Gloves and long-sleeve clothing are recommended to protect the skin.

Once the sealing wood finish has been applied to the wood product and has been given ample time to dry, it seals the wood rendering it waterproof and resistant to other liquids such as alcohols and stains.

It is believed that the sealed finish is provided due to a combination of chemical reactions. The tung oil is oxidized when exposed to air and reacts with itself to form a hard finish on the wood. The jojoba is actually a liquid wax containing high quantities of wax esters. When the tung oil is oxidized, it reacts with some of the jojoba wax esters, forming complex cross-linking, thereby, providing the sealing finish.

The sealing wood finish of the present invention makes a wood product waterproof and resistant to liquids such as alcohols and stains. The sealing wood finish is easy to apply and is not as toxic as other sealing wood finishes.

Although the present invention has been described in relation to particular embodiments thereof, many other variations and modifications and uses will become apparent to those skilled in the art. It is preferred, therefore, that the present invention be limited not by the specific disclosure herein, but only by the appended claims.

I claim:

1. A sealing wood finish comprising, by volume, approximately 25% jojoba oil, 25% tung oil, 45% isopropanol and 5% methylene chloride.

2. A sealing wood finish comprising, by volume, approximately 25% jojoba oil, 25% tung oil, 5% methylene chloride and 45% of an organic solvent to aid said oils absorption into the wood.

3. The sealing wood finish of claim 2 wherein said solvent is chosen from the group consisting of isopropanol, hexane, toluene, methanol, and chloroform.

* * * * *